(12) United States Patent
Caleffi

(10) Patent No.: US 7,617,989 B2
(45) Date of Patent: Nov. 17, 2009

(54) AUTOMATICALLY RECLOSABLE THERMOSTATIC CONTROL DEVICE FOR VALVES

(75) Inventor: Marco Caleffi, Borgomanero (IT)

(73) Assignee: Caleffi S.p.A., Fontaneto d'Agogna (NO) (IT)

( * ) Notice: Subject to any disclaimer, the term of this patent is extended or adjusted under 35 U.S.C. 154(b) by 506 days.

(21) Appl. No.: 11/410,119

(22) Filed: Apr. 25, 2006

(65) Prior Publication Data
US 2006/0237549 A1  Oct. 26, 2006

(30) Foreign Application Priority Data
Apr. 26, 2005  (IT)  .................. MI2005A000742

(51) Int. Cl.
*G05D 23/02* (2006.01)
(52) U.S. Cl. .................. 236/99 R; 236/93 R; 236/99 K
(58) Field of Classification Search ............... 236/93 R, 236/12.2, 99 K, 99 J, 99 R, 100, 93 A; 62/157, 62/218; 251/285
See application file for complete search history.

(56) References Cited

U.S. PATENT DOCUMENTS

| | | | | | |
|---|---|---|---|---|---|
| 1,439,750 | A | * | 12/1922 | Nelson | ........................ 236/99 R |
| 1,636,698 | A | * | 7/1927 | Leonard et al. | ............. 200/56 R |
| 1,890,909 | A | * | 12/1932 | Lincoln | ........................ 324/106 |
| 2,214,375 | A | * | 9/1940 | Jackson | ......................... 137/94 |
| 2,336,858 | A | * | 12/1943 | Giesler | ........................ 236/34.5 |
| 2,556,777 | A | * | 6/1951 | Reimuller | ................... 236/93 R |
| 2,687,851 | A | * | 8/1954 | Armstrong | ..................... 236/1 R |
| 2,735,621 | A | * | 2/1956 | Homfeldt | ..................... 236/34.5 |
| 2,954,930 | A | * | 10/1960 | Linder | .......................... 236/34.5 |
| 2,982,474 | A | * | 5/1961 | Rimsha | ........................ 236/12.2 |
| 3,253,612 | A | * | 5/1966 | Curatola et al. | ............... 137/553 |
| 3,860,170 | A | * | 1/1975 | Katchka | ..................... 236/92 A |
| 3,952,946 | A | * | 4/1976 | Braukmann | ................... 236/34 |
| 4,011,988 | A | * | 3/1977 | Inagaki | ....................... 236/34.5 |

(Continued)

FOREIGN PATENT DOCUMENTS

DE   102 15 473   11/2003

(Continued)

OTHER PUBLICATIONS

Search Report from European Patent Office issued on Jul. 3, 2007.

(Continued)

*Primary Examiner*—Frantz F Jules
*Assistant Examiner*—Alexis K Cox
(74) *Attorney, Agent, or Firm*—Young & Thompson

(57) ABSTRACT

Thermostatic control device for controlling valves provided with an axially movable stem, includes a base body, an electrically operated thermostatic actuator, and intermediate connecting elements between the thermostatic actuator and the stem of the valve; the device also includes a cap assembly, having a cylindrical portion secured to the base body, and a control knob, movably supported by the cylindrical portion, the knob being operatively connected to the stem of the valve. The cylindrical portion and the knob have cam elements conformed to cause an axial movement of the knob by its manual rotation; the device also includes disengageable retaining elements for retaining the knob in an open position of the valve, and torsional spring elements for automatically returning the control knob to a closed position of the valve upon disengagement of the retaining elements from the knob.

18 Claims, 5 Drawing Sheets

U.S. PATENT DOCUMENTS

| | | | | |
|---|---|---|---|---|
| 4,175,696 | A * | 11/1979 | Braukmann | 236/34.5 |
| 5,385,296 | A * | 1/1995 | Kurz et al. | 236/34.5 |
| 5,897,055 | A | 4/1999 | Saur et al. | |
| 7,497,228 | B2 * | 3/2009 | Taylor et al. | 137/59 |
| 2002/0020754 | A1 * | 2/2002 | Taylor et al. | 236/12.1 |
| 2003/0150923 | A1 * | 8/2003 | Leu | 236/34.5 |
| 2004/0084543 | A1 * | 5/2004 | Axe | 236/101 R |
| 2005/0082289 | A1 * | 4/2005 | Reutter | 220/203.27 |
| 2005/0181647 | A1 * | 8/2005 | Dehnen et al. | 439/134 |
| 2005/0224592 | A1 * | 10/2005 | Inoue | 236/101 R |
| 2006/0157575 | A1 * | 7/2006 | Lockhart | 236/93 A |
| 2008/0257969 | A1 * | 10/2008 | Nember | 236/93 A |

FOREIGN PATENT DOCUMENTS

| | | |
|---|---|---|
| EP | 0 346 892 | 12/1989 |
| EP | 0 856 692 | 8/1998 |
| EP | 1 020 782 | 7/2000 |
| EP | 101 06 257 | 9/2002 |
| EP | 1 359 489 | 11/2003 |
| EP | 1959202 A2 * | 8/2008 |

OTHER PUBLICATIONS

Danfoss: "Data Sheet—Actuator 0-10V Proportional Type ABNM", Internet Article Online, Feb. 28, 2005, XP002422433.

* cited by examiner

AUTOMATICALLY RECLOSABLE THERMOSTATIC CONTROL DEVICE FOR VALVES

BACKGROUND OF THE INVENTION

This invention concerns a thermostatic control device for flow control valves for regulating the flow of a thermal fluid; the control device can be used in particular in combination with a room thermostat or other electrical switch device, for controlling valves directly fitted onto radiators, or installed in distribution manifolds for heating systems, or onto zone valves.

STATE OF THE ART

In general, a wide use is made of thermostatic control devices for flow control valves for regulating the flow of thermal fluids, as for example described in EP 1 020 782, and EP 0 856 692, which are especially suitable for controlling valves provided with an axially movable stem for operating a plug member for closing the same valves.

Conventionally, a thermostatic control device of this kind comprises a base body which can be removably secured to the valve, and an axially extensible thermostatic actuator operated by a heating element, which is controlled by a thermostat for regulating the room temperature, or by any another electrical switch device.

The flow control device also comprises an intermediate connecting member between the thermostatic actuator and the stem of the valve, upon which acts a counteracting spring designed to exert an axial thrust on the stem of the same valve, and a cap for housing the thermostatic actuator and the connecting member, secured to the base body.

A thermostatic control device of this kind however, when it is fitted on a valve, in the absence of power supply for the heating element which operate the thermostatic actuator, maintains the valve in a closed condition.

Consequently, whenever for installation requirements, for example for the general seal testing of the heating system or for inspection or maintenance operations of the same system, it is required to make the thermal fluid circulate also in the absence of the power supply for the aforesaid heating element, it is therefore necessary to remove the control device from the valve, so that the valve assumes an open condition and the fluid is able to circulate.

The removal and subsequent refitting of the control device however prove in certain cases to be somewhat difficult or in any case time consuming, and in the case of systems having distribution manifolds, which are provided with several control devices, there is a possibility of some of the control devices being refitted incorrectly onto valves differing from those contemplated in the original design, with consequent system operative problems.

One possible solution for at least partially obviating these problems has been suggested in DE 101 06 257, which concerns a thermostatic control device of the aforementioned kind, also comprising a base body, a thermostatic actuator, a counteracting spring and a housing cap, and further comprising a cursor sliding transversally between two positions, provided with a U-shaped thrust member having two legs of different lengths, the cursor and the thrust member being disposed between the thermostatic actuator and the stem of the valve to act as an intermediate connecting member.

A control device of this kind, in relation to the transversal position of the aforesaid cursor, allows to establish beforehand that the valve to be fitted is in an open condition or in a closed condition, in the absence of power supply for the heating element operating the thermostatic actuator.

In order to facilitate the transversal sliding of the aforesaid cursor, the housing cap comprises a cylindrical portion secured to the base body, and a control knob movably supported by the same cylindrical portion, the knob being operatively connected to the stem of the valve by means of the thermostatic actuator and the same cursor.

The cylindrical portion and the control knob have cam means conformed in such a way as to cause an axial movement of the knob by its manual rotation, between a first closed position and a second open position of the valve, in correspondence with which the cursor can be freely moved thanks to a backward movement of the thermostatic actuator.

Therefore, with a control device of this kind it is possible to manually open the valve, by simply operating the knob, in order to move the aforesaid cursor, allowing in this way the circulation of the thermal fluid through the system, without any longer having to remove the control device from the same valve.

However, after having carried out the operations and/or the tests for which it was necessary to manually open the valves, the operators have to manually re-close the valves, by going to each radiator or each manifold existing in the system, which proves to be extremely time-consuming, especially in the case of very large heating systems; moreover, in the event of one or more valves being inadvertently left open, the system would not be able to correctly operate, thus involving further losses of time to locate the cause of the malfunctioning.

OBJECTS OF THE INVENTION

The object of this invention is to provide a thermostatic control device for valves of the aforementioned kind, which allows the valve to be manually opened by an operator, and which also performs an automatic reclosure of the same valve when the thermostatic actuator of the control device is operated.

BRIEF DESCRIPTION OF THE INVENTION

The above can be achieved by means of a thermostatic control device for a flow control valve having a valve body and an axially movable plug member provided with a stem, the device comprising:

a base body secured to the body of the valve;

an axially extensible thermostatic actuator having a heating element;

intermediate connecting means between the thermostatic actuator and the stem of the valve plug;

counteracting spring means conformed and disposed between the base body of the device and the intermediate connecting means;

a cap assembly for housing the thermostatic actuator and the intermediate connecting means, said cap assembly comprising a cylindrical portion secured to said base body, and a control knob movably supported by said cylindrical portion of the cap assembly, the control knob being in turn operatively connected to the stem of the valve plug by said intermediate connecting means;

cam means conformed and arranged to cause an axial movement of the control knob by its rotation, between a first position and a second position;

retaining means for retaining the control knob in said second position, said retaining means being conformed and operatively connected to the thermostatic actuator to cause their disengagement from the control knob upon extension of the thermostatic actuator caused by said heating element, and torsional spring means arranged for automatically moving the control knob from said second position to said first position upon disengagement of the control knob from said retaining means.

BRIEF DESCRIPTION OF THE DRAWINGS

These and further features according to this invention, will be more clearly evident from the following description with reference to the accompanying drawings, in which.

DETAILED DESCRIPTION OF THE INVENTION

The general features of this invention will be illustrated hereunder by means of an exemplificative embodiment.

Figure 1:
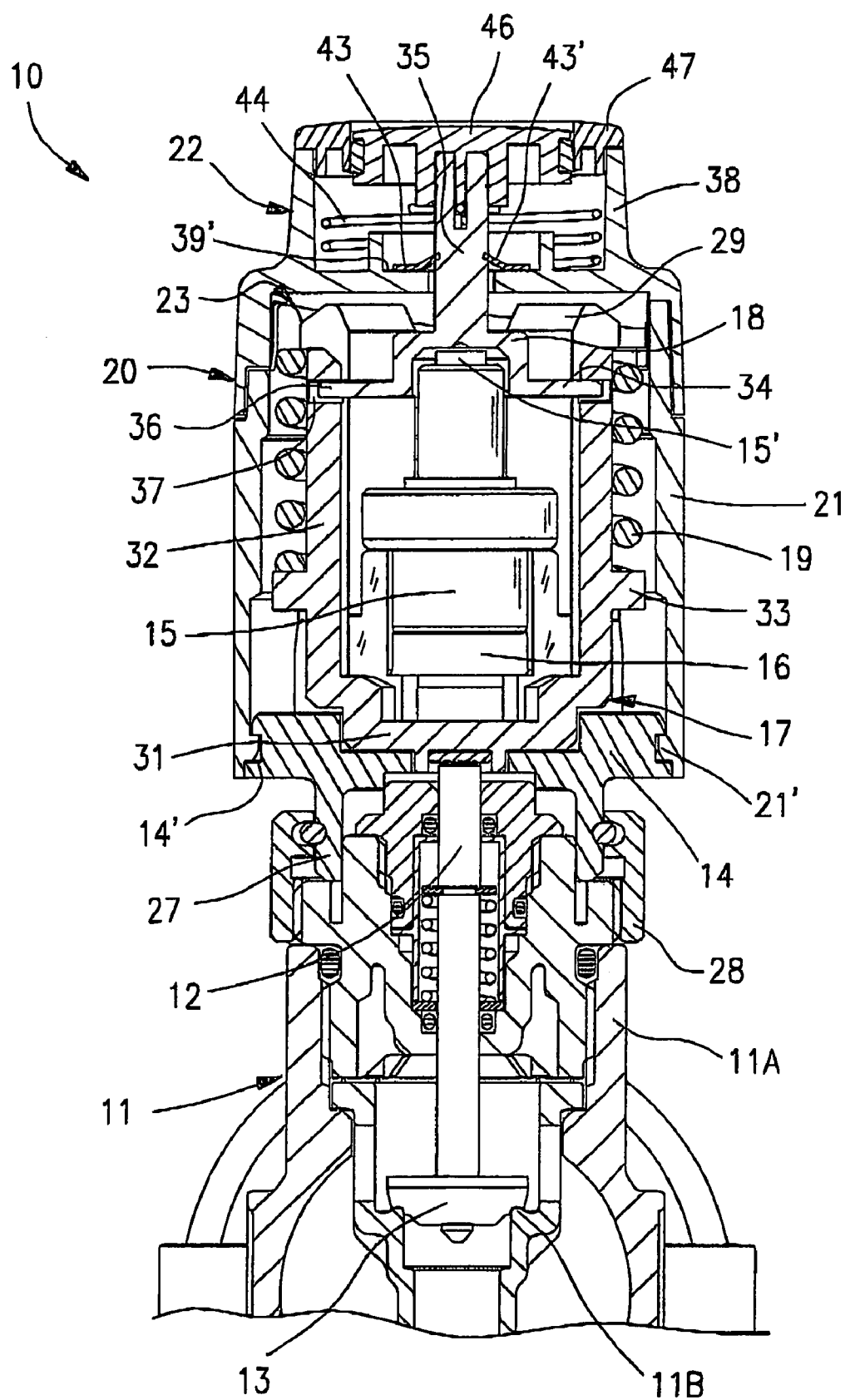
FIG. 1 shows a longitudinal cross-sectional view, according to a first sectional plane, of a thermostatic control device according to this invention, connected to a generic valve, in a closed condition of the valve itself.
Figure 2:
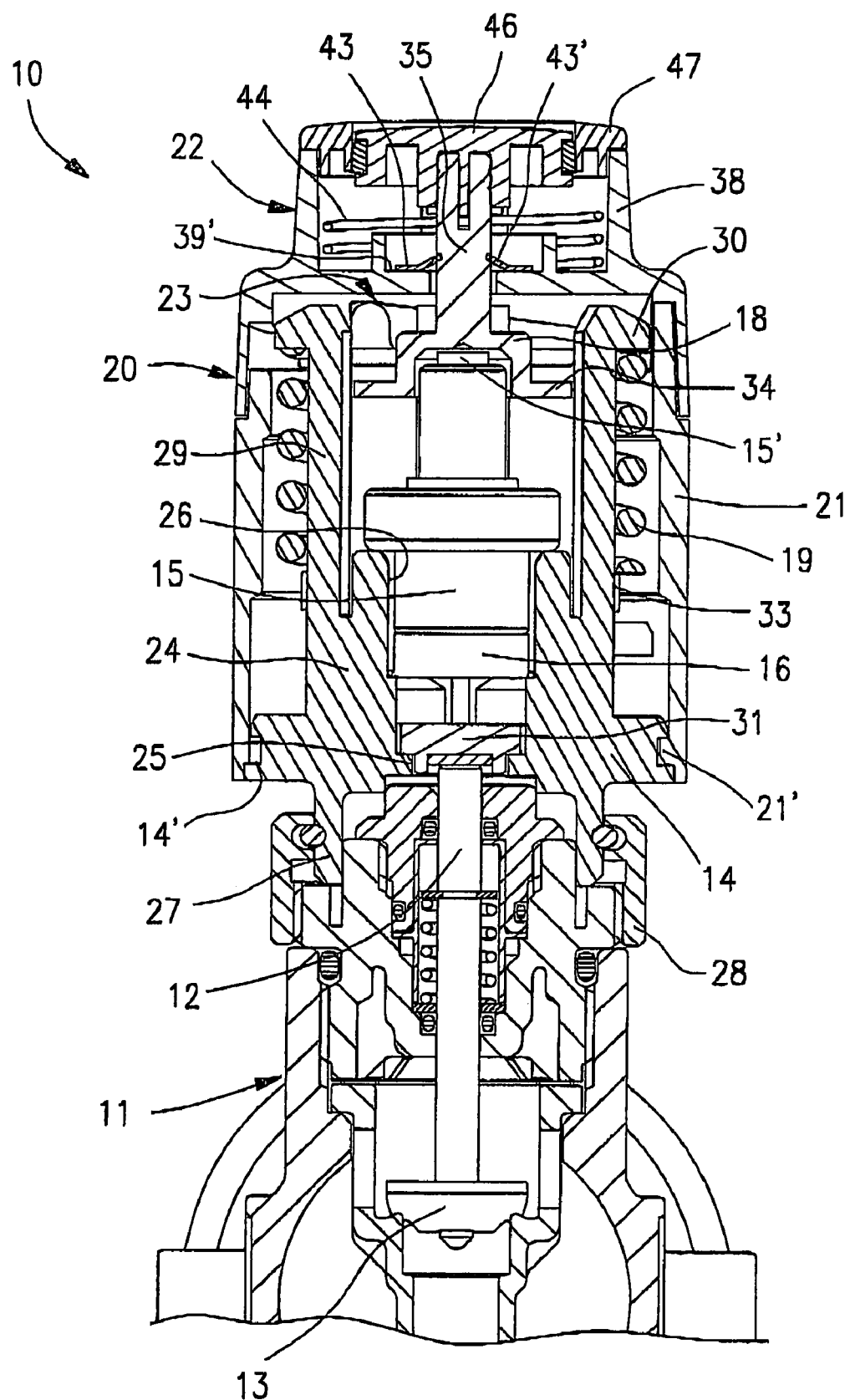
FIG. 2 shows a longitudinal cross-sectional view of the thermostatic control device of FIG. 1, according to a different sectional plane.

FIGS. 1 and 2 show a thermostatic control device for valves according to this invention, indicated as a whole by the reference number 10, which is especially suitable for controlling valves 11 comprising a valve body 11A having a seating 11B for an axially movable plug member 13 provided with a stem 12.

In the case shown in the figures, the control device 10 is of the so-called "normally closed" type, which in the absence of an electrical power supply, maintains the valve in a closed condition.

The control device 10, which extends according to a longitudinal axis, comprises a base body 14 removably secured to the body 11A of the valve 11, which supports an axially extensible thermostatic actuator 15 having a heating element 16, the actuator 15 being for example of wax-expansion type or other suitable type.

The device 10 also comprises intermediate connecting means between the thermostatic actuator 15 and the stem 12 of the valve plug 13; preferentially, the intermediate connecting means comprise a thrust member 17 for the stem 12 of the valve 11, and a pull member 18 for drawing the thrust member 17, the pull member 18 being operatively connected and interposed between the thrust member 17 and the thermostatic actuator 15, as explained further on.

The device 10 also comprises a counteracting spring means 19 disposed between the base body 14 and the intermediate connecting means 17, 18 to exert an axial thrust on the stem 12 of the valve 11.

The base body 14, the thermostatic actuator 15 and the intermediate connecting means 17, 18 are enclosed in a housing cap assembly 20 comprising a cylindrical portion 21 secured to the base body 14, for example by a series of internal protrusions 21' in the cylindrical portion 21 engageable in a peripheral slot 14' in the base body 14, and a control knob 22 movably supported, rotatably and axially, by the cylindrical portion 21, the knob 22 being in turn operatively connected to the stem 12 of the valve plug 13 by the intermediate connecting means 17, 18.

The cylindrical portion 21 and the knob 22 of the cap assembly 20 are provided with cam means 23 conformed to cause an axial movement of the knob 22 by its manual rotation, between a first position and a second position; in particular, for a control device 10 of the "normally closed" type as illustrated, the knob 22 will move between a first closed forward position and a second open backward position of the valve.

Figure 7:
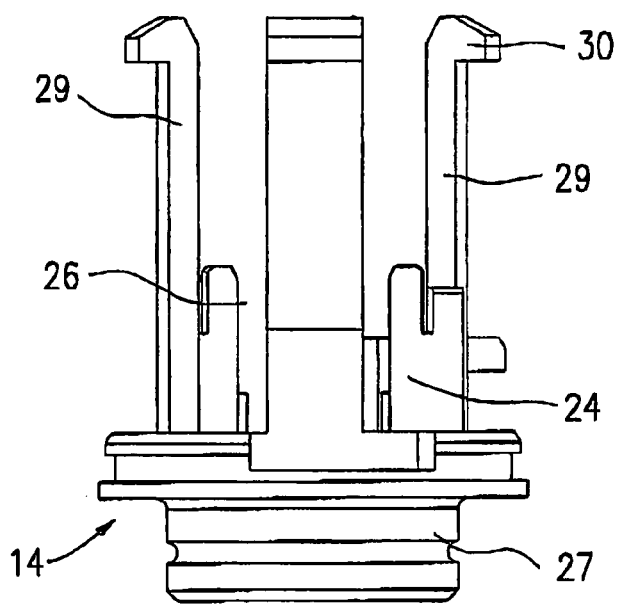
FIG. 7 shows a side view of the base body of the control device of FIG. 1.

Preferentially, as shown in FIGS. 2 and 7 the base body 14 comprises a central portion 24 provided with an axial hole 25 for the passage of the stem 12 of the valve plug 13, and a seat 26 for housing the thermostatic actuator 15.

The base body 14 also comprises a connecting collar 27 for connection with the valve body 11A which extends towards a first end of the central portion 24, the connecting collar 27 being for example conformed for rotatably supporting a threaded ring 28 that can be screwed onto the same valve body 11A for securing the control device 10.

The base body 14 also comprises a plurality of support legs 29 for supporting the counteracting spring 19, which extend axially from the central portion 24 towards a second opposite end of the base body 14 with respect to the collar 27; each leg 29 ends with a radial shoulder protrusion 30 against which comes to rest a first end of the counteracting spring 19.

Figure 6:
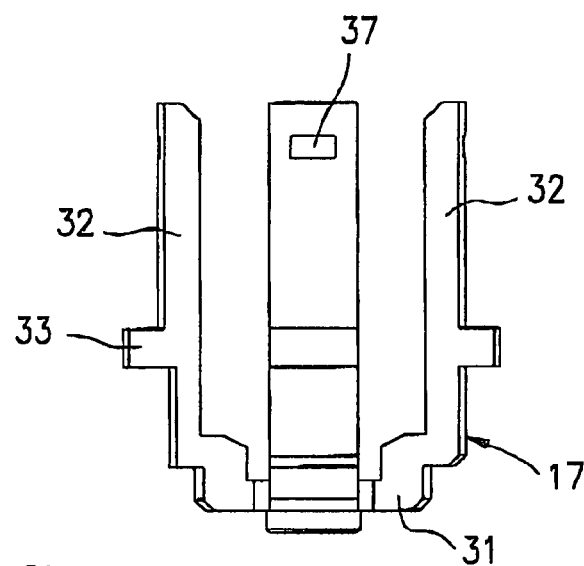
FIG. 6 shows a side view of the thrust member of the control device of FIG. 1.

As illustrated in FIGS. 1 and 6, preferentially the thrust member 17 is in the form of a cage comprising a bottom wall 31 designed to exert an axial thrust on the stem 12 of the valve plug 13, and a plurality of arms 32 which extend axially from the bottom wall 31; the thrust member 17 is inserted and disposed in such a way as to be axially movable within the base body 14, with the bottom wall 31 of the thrust member 17 facing towards the aforesaid first end of the base body 14, and with the arms 32 extending parallel to one another and disposed between the legs 29 of the base body 14.

Each of the arms 32 of the thrust member 17 in turn comprises means for securing the pull member 18, at an opposite end with respect to the bottom wall 31, as explained further on, and a plurality of radial shoulder protrusions 33, in an intermediate position along the arms 32 themselves, against which rests a second end of the counteracting spring 19, in such a way that the same counteracting spring 19 is axially compressed between the radial protrusions 30, 33 respectively of the base body 14 and the thrust member 17.

As illustrated in FIG. 1, preferentially the pull member 18 comprises a base plate 34 and a central shank 35 which extends axially from the base plate 34, in the opposite direction with respect to the bottom wall 31 of the thrust member 17; the base plate 34 has a front side against which can act an axially extensible rod 15' of the thermostatic actuator 15.

The base plate 34 is provided with respective means for securing the pull member 18 to the arms 32 of the thrust member 17, which preferentially comprise a plurality of coupling teeth 36 provided peripherally on the same base plate 34, which engage in securing means provided on the thrust member 17, preferentially comprising a plurality of fastening holes 37 at the end of the arms 32 of the thrust member 17.

Figure 5:
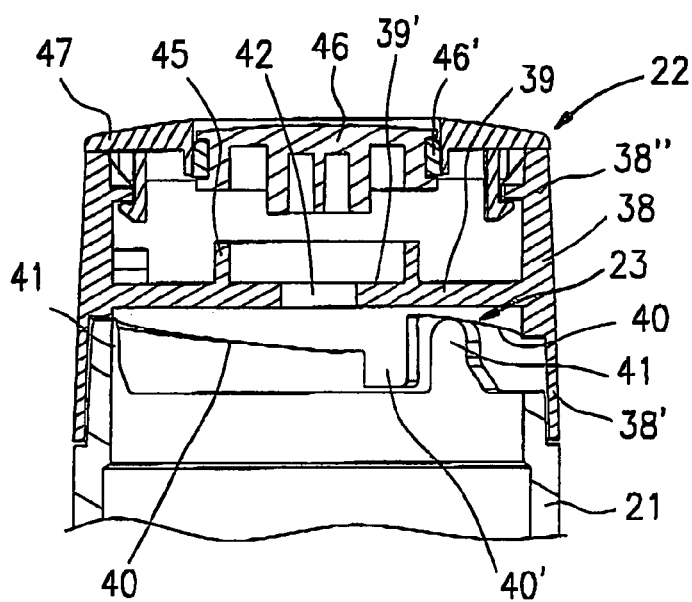
FIG. 5 shows a cutaway view of the control knob and of the cylindrical portion of the cap assembly of the control device of FIG. 1.

As shown in the figures, in particular in FIG. 5, the control knob 22, which is disposed at a rear end of the control device 10, preferentially comprises a peripheral wall 38 rotatably supported by the cylindrical portion 21 of the cap assembly 20; the peripheral wall 38 in turn comprises an intermediate dividing wall 39 between a front portion 38' and a rear portion 38" of the peripheral wall 38.

In the front portion 38' of the peripheral wall 38, at least one axial cam 40 is provided of the aforesaid cam means 23, in this case three axial cams 40 having respective limit stops 40' for the opening of the knob 22, each of such cams 40 being in contact with a corresponding rounded protrusion 41 of the cylindrical portion 21 of the cap assembly 20, for movably supporting the knob 22, rotatably and axially.

The intermediate wall 39 is provided with a hole 42 for the passage of the central shank 35 of the pull member 18, by which the pull member 18, which slides axially with respect to the control knob 22, can extend rearwardly to the wall 39 of the knob 22.

The control device 10 according to this invention also comprises retaining means for retaining the knob 22 in the second position, which are conformed and operatively connected to the thermostatic actuator 15 in such a way as to cause their disengagement from the control knob 22 upon extension of the thermostatic actuator 15 caused by the heating element 16.

Preferentially, the retaining means for retaining the knob 22 comprise at least one frictional retaining element 43, which is secured to the central shank 35 of the pull member 18, rearwardly to the dividing wall 39, in such a way that a front surface of the same retaining element 43 can come into contact with a shoulder surface 39' of the knob 22 in correspondence with non-extended operative conditions of the thermostatic actuator 15.

Figure 3:
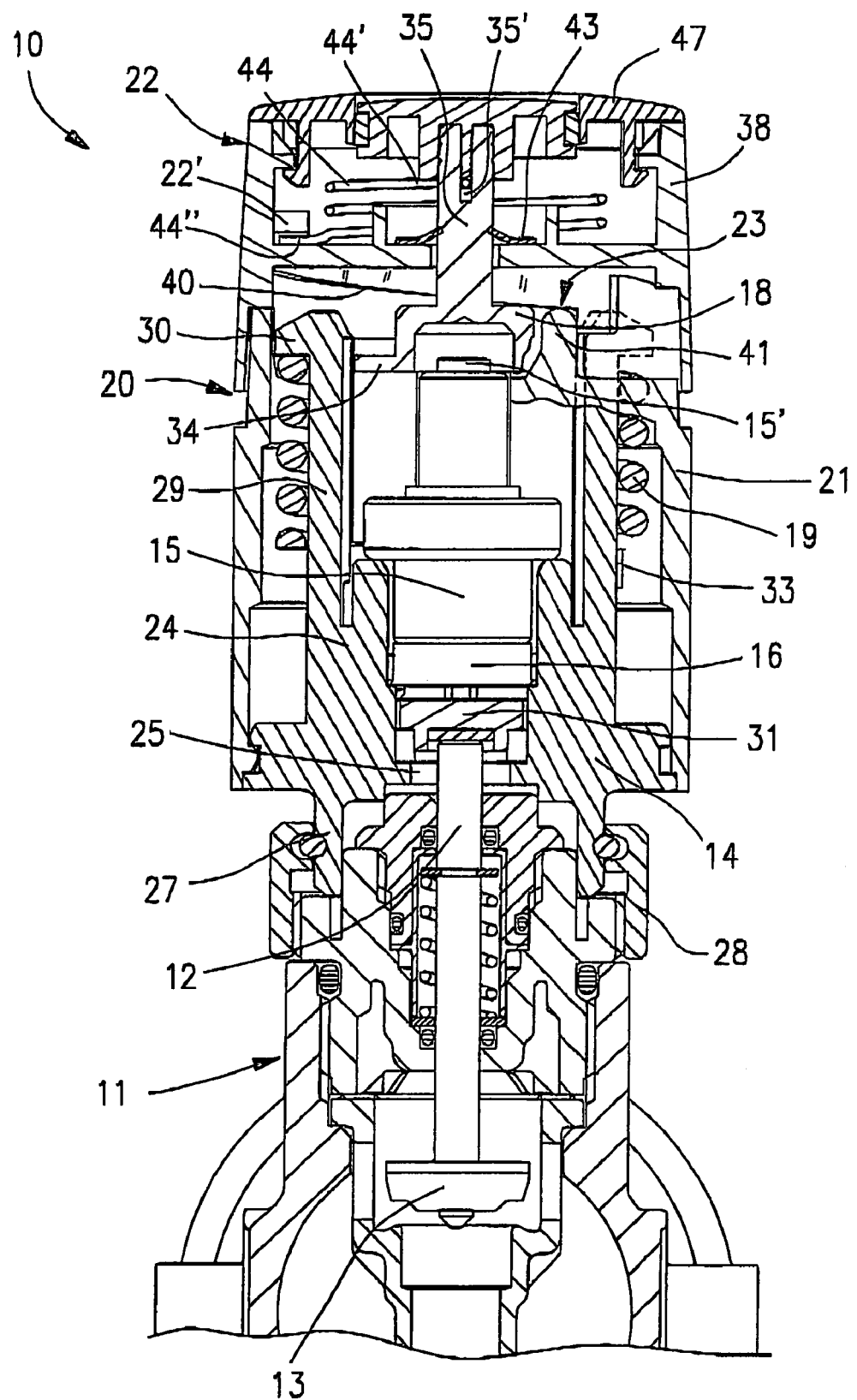
FIG. 3 shows a longitudinal cross-sectional view of the thermostatic control device of FIG. 2, with the valve opened manually by means of the knob of the same control device.
Figure 4:
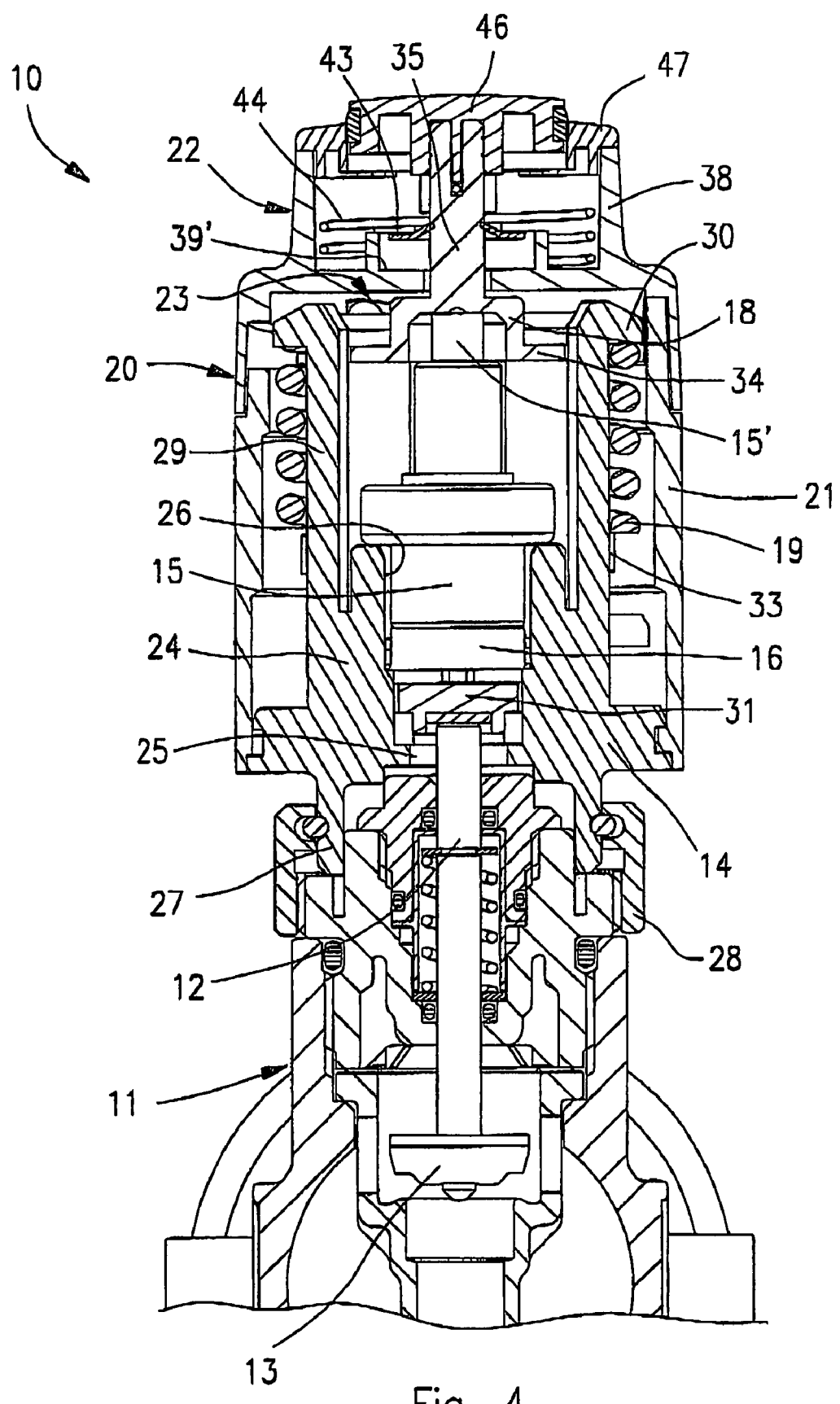
FIG. 4 shows a longitudinal cross-sectional view of the thermostatic control device of FIG. 2, with the valve opened electrically upon operation of the thermostatic actuator of the control device.

Said non-extended operative conditions are for example the condition shown in FIGS. 1 and 2, in which the control device 10 maintains the valve closed, in that the heating element 16 for operating the thermostatic actuator 15 is not supplied with power and the control knob 22 is closed, and the condition shown in FIG. 3, in which the control device 10, in the absence of power supply to the heating element 16 for operating the thermostatic actuator 15, maintains the valve open thanks to the opening action of the control knob 22.

The retaining element 43 can thus exert a pulling action on the thrust member 17 by means of the pull member 18, and an anti-rotating retaining action on the knob 22 in correspondence with the aforesaid non-extended operative conditions of the thermostatic actuator 15.

Conversely, the operation of the thermostatic actuator 15 by the heating element 16 will cause the same actuator 15 to assume an extended operating condition, in which the thrust of the rod 15' will cause the shank 35 of the pull member 18 to move backwards with respect to the knob 22, causing the retaining element 43 to become detached and disengaged from the shoulder surface 39' of the same knob 22, so as to allow its rotation.

Preferentially, the frictional retaining element 43 is in the form of a washer, coaxially secured to the shank 35 of the pull member 18, which is conformed and arranged to be elastically yieldable in an axial direction, for example with a conical central portion 43', so as to allow to take up any slack between the knob 22 and the cylindrical portion 21 of the cap assembly 20.

The control device 10 also comprises torsional spring means 44 for automatically moving the control knob 22 from the second position to the first position upon disengagement of the knob 22 from the retaining means 43.

As more clearly illustrated in FIG. 3, the aforesaid torsional spring means 44, inserted together with the retaining means 43 in a housing defined by the rear portion 38" of the peripheral wall 38 of the knob 22, are preferentially in the form of a helical spring 44 coaxially arranged to the shank 35 of the pull member 18, which has a first and a second end 44', 44" secured to the shank 35 of the pull member 18, and respectively to the control knob 22.

Preferentially, the shank 35 of the pull member 18 is provided with a longitudinal slit 35' for blocking the first end 44' of the helical torsion spring 44, while the control knob 22 is provided with a blocking tab 22' for blocking the second end 44" of the same helical torsion spring 44.

In this way, since the pull member 18 is not able to rotate but only to translate in an axial direction, a rotation of the control knob 22 will cause the helical spring 44 to undergo a torsional deformation, thus giving rise to a torque which will be sufficient to bring the knob 22 back to the first position, after the knob 22 is released by the retaining element 43 upon extension of the thermostatic actuator 15.

Moreover, the two ends 44' and 44" of the helical torsion spring 44 are secured in such a way as to be slightly compressed in an axial direction, in order to take up any slack between the knob 22 and the cylindrical portion 21 of the cap assembly 20.

The thermostatic control device 10 according to this invention achieves the intended object, in that it enables an operator to carry out a manual opening of the valve, and performs an automatic reclosure of the same valve when the thermostatic actuator of the control device is operated.

In fact, when the knob 22 is rotated by the operator from the closed position illustrated in FIG. 2 to the open position of the valve illustrated in FIG. 3, the shoulder surface 39' of the knob 22 moves backward pushing back with it the retaining element 43 and together with it the pull member 18 and the thrust member 17 for the stem 12 of the valve plug 13.

The backward movement of the thrust member 17 has the effect of compressing the counteracting spring 19 between the shoulder protrusions 30, 33 of the base body 14, and respectively of the thrust member 17; in this way, the counteracting spring 19 comes to exert an axial thrust which tends to maintain the retaining element 43 against the shoulder surface 39' of the knob 22, generating a sufficient frictional retaining force to maintain the knob 22 blocked.

Simultaneously, the rotation of the knob 22 causes a torsional deformation and loading of the helical spring 44, which allows the same knob 22 to be automatically returned to the first position, after the retaining element 43 has released the knob 22 due to the extension of the thermostatic actuator 15.

Preferentially, in order to protect the area inside the helical torsion spring 44, the dividing wall 39 of the knob 22 comprises, on a rear side, an annular wall 45 for limiting the radial deformation of the torsional spring 44, disposed inside to the same helical spring 44.

Preferentially, the control device 10 also comprises an indicator 46 for indicating the position of the stem 12 of the valve 11, said indicator 46 being operatively connected to the central shank 35 of the pull member 18 to extend rearwardly to the control knob 22, through a closing top 47 for the knob 22, in the extended condition of the thermostatic actuator 15 of the device 10.

For example, the position indicator 46 may be in the form of an axially movable piston, having a peripheral portion 46' made of coloured rubber to more clearly highlight the position of the piston itself with respect to the closing top 47 of the knob 22.

What has been described and shown with reference to the accompanying drawings, has been given purely by way of example in order to illustrate the general features of the invention, and one of its preferential embodiments; consequently other modifications and variations made be made to the thermostatic control device, without thereby deviating from the scope of the claims.

I claim:

1. A thermostatic control device for a flow control valve having a valve body and an axially movable plug member provided with a stem, the device comprising:
    a base body secured to the body of the valve;
    an axially extensible thermostatic actuator having a heating element;
    intermediate connecting means between the thermostatic actuator and the stem of the valve plug;
    counteracting spring means conformed and disposed between the base body of the device and the intermediate connecting means;
    a cap assembly for housing the thermostatic actuator and the intermediate connecting means, said cap assembly comprising a cylindrical portion secured to said base body, and a control knob movably supported by said cylindrical portion of the cap assembly, the control knob being in turn operatively connected to the stem of the valve plug by said intermediate connecting means;
    cam means conformed and arranged to cause an axial movement of the control knob by the manual rotation of the control knob between a first position and a second position;
    retaining means for retaining the control knob in said second position, said retaining means being conformed and operatively connected to the thermostatic actuator to cause disengagement of the retaining means from the control knob upon extension of the thermostatic actuator caused by said heating element, and
    torsional spring means arranged for automatically moving the control knob from said second position to said first position upon disengagement of the control knob from said retaining means.

2. Thermostatic control device according to claim 1, wherein said intermediate connecting means comprise a thrust member for the stem of the valve plug, and a pull member for drawing the thrust member, said pull member being operatively connected and interposed between the thrust member and the thermostatic actuator, and sliding axially with respect to the control knob.

3. Thermostatic control device according to claim 2, wherein said base body comprises:
    a central portion provided with an axial hole for the passage of the stem of the valve plug, the central portion being provided with a seat for housing said thermostatic actuator;
    a connecting collar for connection to the valve body, which extends towards a first end of said central portion of the base body; and
    a plurality of support legs for supporting said counteracting spring, which extend axially from said central portion towards a second opposite end of the base body with respect to said connecting collar, each leg of said plurality of legs ending with a radial shoulder protrusion for said counteracting spring.

4. Thermostatic control device according to claim 3, wherein said thrust member is in the form of a cage comprising a bottom wall designed to exert an axial thrust on the stem of the valve plug, and a plurality of arms which extend axially from said bottom wall, said thrust member being arranged to be axially movable within said base body, in which the bottom wall of the thrust member faces towards said first end of the base body, and in which the arms of the thrust member extend parallel to one another and are disposed between said support legs of the base body.

5. Thermostatic control device according to claim 4, wherein said plurality of arms of the thrust member comprises:
    fastening means for fastening said pull member to an opposite end of the thrust member with respect to the bottom wall, and
    a plurality of radial shoulder protrusions for said counteracting spring, in an intermediate position along the same arms, the counteracting spring being disposed axially compressed between the radial shoulder protrusions respectively of the base body and of the thrust member.

6. A thermostatic control device for a flow control valve having a valve body and an axially movable plug member provided with a stem, the device comprising:
    a base body secured to the body of the valve;
    an axially extensible thermostatic actuator having a heating element;
    intermediate connecting means between the thermostatic actuator and the stem of the valve plug;
    counteracting spring means conformed and disposed between the base body of the device and the intermediate connecting means;
    a cap assembly for housing the thermostatic actuator and the intermediate connecting means, said cap assembly comprising a cylindrical portion secured to said base body, and a control knob movably supported by said cylindrical portion of the cap assembly, the control knob being in turn operatively connected to the stem of the valve plug by said intermediate connecting means;
    cam means conformed and arranged to cause an axial movement of the control knob by the manual rotation of the control knob between a first position and a second position;
    retaining means for retaining the control knob in said second position, said retaining means being conformed and operatively connected to the thermostatic actuator to cause disengagement of the retaining means from the control knob upon extension of the thermostatic actuator caused by said heating element, and
    torsional spring means arranged for automatically moving the control knob from said second position to said first position upon disengagement of the control knob from said retaining means,
    wherein said intermediate connecting means comprise a thrust member for the stem of the valve plug, and a pull member for drawing the thrust member, said pull member being operatively connected and interposed between the thrust member and the thermostatic actuator, and sliding axially with respect to the control knob,
    wherein said base body comprises:
        a central portion provided with an axial hole for the passage of the stem of the valve plug, the central portion being provided with a seat for housing said thermostatic actuator;
        a connecting collar for connection to the valve body, which extends towards a first end of said central portion of the base body; and
        a plurality of support legs for supporting said counteracting spring, which extend axially from said central portion towards a second opposite end of the base body with respect to said connecting collar, each leg of said plurality of legs ending with a radial shoulder protrusion for said counteracting spring,
wherein said thrust member is in the form of a cage comprising a bottom wall designed to exert an axial thrust on the stem of the valve plug, and a plurality of arms which extend axially from said bottom wall, said thrust member being arranged to be axially movable within said base body, in which the bottom wall of the thrust member faces towards said first end of the base body, and in which the arms of the thrust member extend parallel to one another and are disposed between said support legs of the base body,
wherein said plurality of arms of the thrust member comprises:
fastening means for fastening said pull member to an opposite end of the thrust member with respect to the bottom wall, and
a plurality of radial shoulder protrusions for said counteracting spring, in an intermediate position along the same arms, the counteracting spring being disposed axially compressed between the radial shoulder protrusions respectively of the base body and of the thrust member, and
wherein said pull member comprises:
a base plate provided with fastening means for fastening the same pull member to the arms of the thrust member, the base plate being contactable by an axially extensible rod of the thermostatic actuator, and
a central shank which extends axially from said base plate, in the opposite direction with respect to the bottom wall of the thrust member.

7. Thermostatic control device according to claim 6, wherein said fastening means for fastening the pull member to the thrust member comprise:
a plurality of coupling teeth peripherally provided on said base plate of the pull member; and
a plurality of fastening holes at the end of said arms of the thrust member, engageable by said coupling teeth of the pull member.

8. Thermostatic control device according to claim 6, in which the control device has a longitudinal axis and in which the control knob is disposed at a rear end of the same control device, wherein the control knob comprises a peripheral wall rotatably supported by said cylindrical portion of the cap assembly, the peripheral wall being provided with an intermediate dividing wall between a front portion of the peripheral wall, in which at least one axial cam is provided of said cam means for contacting at least one corresponding rounded protrusion of the cylindrical portion of the cap assembly, and a rear portion of the peripheral wall, defining a housing for said retaining means of the knob and said torsional spring means,
the intermediate dividing wall being provided with a hole for the passage of said central shank of the pull member.

9. Thermostatic control device according to claim 6, wherein said retaining means for the knob comprise at least one frictional retaining element secured to the central shank of the pull member, the retaining element having a front surface designed to come into contact with a shoulder surface of the knob, in correspondence with non-extended operative conditions of the thermostatic actuator, to exert a pulling action on said thrust member and an anti-rotating retaining action on the control knob.

10. Thermostatic control device according to claim 9, wherein said frictional retaining element is in the form of a washer coaxially secured to the shank of the pull member, said washer being conformed so as to be elastically yieldable in an axial direction.

11. Thermostatic control device according to claim 8, wherein said torsional spring means are in the form of a helical spring disposed coaxially to said shank of the pull member, the helical spring having a first and a second end respectively secured to the shank of the pull member, and to the control knob.

12. Thermostatic control device according to claim 11, wherein the shank of the pull member is provided with a longitudinal slit for blocking said first end of the helical torsion spring, the control knob being provided with a blocking tab for blocking said second end of the same helical torsion spring.

13. Thermostatic control device according to claim 11, wherein said dividing wall of the control knob comprises, on a rear side, an annular wall for limiting the radial deformation of the helical torsion spring, said annular wall being disposed internally with respect to the same helical spring.

14. Thermostatic control device according to claim 6, comprising an indicator for indicating the position of the stem of the valve, said position indicator being operatively connected to the central shank of the pull member to extend rearwardly to the control knob in an extended condition of the thermostatic actuator of the device.

15. Thermostatic control device according to claim 1, wherein said base body comprises:
a central portion provided with an axial hole for the passage of the stem of the valve plug, the central portion being provided with a seat for housing said thermostatic actuator;
a connecting collar for connection to the valve body, which extends towards a first end of said central portion of the base body; and
a plurality of support legs for supporting said counteracting spring, which extend axially from said central portion towards a second opposite end of the base body with respect to said connecting collar, each leg of said plurality of legs ending with a radial shoulder protrusion for said counteracting spring.

16. Thermostatic control device according to claim 2, wherein said thrust member is in the form of a cage comprising a bottom wall designed to exert an axial thrust on the stem of the valve plug, and a plurality of arms which extend axially from said bottom wall, said thrust member being arranged to be axially movable within said base body, in which the bottom wall of the thrust member faces towards said first end of the base body, and in which the arms of the thrust member extend parallel to one another and are disposed between said support legs of the base body.

17. A thermostatic control device for a flow control valve having a valve body and an axially movable plug member provided with a stem, the device comprising:
a base body secured to the body of the valve;
an axially extensible thermostatic actuator having a heating element;
intermediate connecting means between the thermostatic actuator and the stem of the valve plug;
counteracting spring means conformed and disposed between the base body of the device and the intermediate connecting means;
a cap assembly for housing the thermostatic actuator and the intermediate connecting means, said cap assembly comprising a cylindrical portion secured to said base body, and a control knob movably supported by said cylindrical portion of the cap assembly, the control knob being in turn operatively connected to the stem of the valve plug by said intermediate connecting means;

cam means conformed and arranged to cause an axial movement of the control knob by the manual rotation of the control knob between a first position and a second position;

retaining means for retaining the control knob in said second position, said retaining means being conformed and operatively connected to the thermostatic actuator to cause disengagement of the retaining means from the control knob upon extension of the thermostatic actuator caused by said heating element, and torsional spring means arranged for automatically moving the control knob from said second position to said first position upon disengagement of the control knob from said retaining means, wherein said intermediate connecting means comprise a thrust member for the stem of the valve plug, and a pull member for drawing the thrust member, said pull member being operatively connected and interposed between the thrust member and the thermostatic actuator, and sliding axially with respect to the control knob, wherein said base body comprises:
- a central portion provided with an axial hole for the passage of the stem of the valve plug, the central portion being provided with a seat for housing said thermostatic actuator;
- a connecting collar for connection to the valve body, which extends towards a first end of said central portion of the base body; and
- a plurality of support legs for supporting said counteracting spring, which extend axially from said central portion towards a second opposite end of the base body with respect to said connecting collar, each leg of said plurality of legs ending with a radial shoulder protrusion for said counteracting spring, wherein said thrust member is in the form of a cage comprising a bottom wall designed to exert an axial thrust on the stem of the valve plug, and a plurality of arms which extend axially from said bottom wall, said thrust member being arranged to be axially movable within said base body, in which the bottom wall of the thrust member faces towards said first end of the base body, and in which the arms of the thrust member extend parallel to one another and are disposed between said support legs of the base body, and wherein said pull member comprises:
- a base plate provided with fastening means for fastening the same pull member to the arms of the thrust member, the base plate being contactable by an axially extensible rod of the thermostatic actuator, and
- a central shank which extends axially from said base plate, in the opposite direction with respect to the bottom wall of the thrust member.

18. Thermostatic control device according to claim 17, in which the control device has a longitudinal axis and in which the control knob is disposed at a rear end of the same control device, wherein the control knob comprises a peripheral wall rotatably supported by said cylindrical portion of the cap assembly, the peripheral wall being provided with an intermediate dividing wall between a front portion of the peripheral wall, in which at least one axial cam is provided of said cam means for contacting at least one corresponding rounded protrusion of the cylindrical portion of the cap assembly, and a rear portion of the peripheral wall, defining a housing for said retaining means of the knob and said torsional spring means, the intermediate dividing wall being provided with a hole for the passage of said central shank of the pull member.

* * * * *

UNITED STATES PATENT AND TRADEMARK OFFICE
CERTIFICATE OF CORRECTION

PATENT NO. : 7,617,989 B2  Page 1 of 1
APPLICATION NO. : 11/410119
DATED : November 17, 2009
INVENTOR(S) : Marco Caleffi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this

Fourteenth Day of December, 2010

David J. Kappos
*Director of the United States Patent and Trademark Office*